US008831651B2

(12) United States Patent
Pudney

(10) Patent No.: US 8,831,651 B2
(45) Date of Patent: Sep. 9, 2014

(54) MSISDN FOR MACHINE TYPE COMMUNICATION DEVICES

(71) Applicant: Vodafone IP Licensing Limited, Newbury (GB)

(72) Inventor: Christopher Pudney, Newsbury (GB)

(73) Assignee: Vodafone IP Licensing Limited, Newbury, Berkshire (GB)

(*) Notice: Subject to any disclaimer, the term of this patent is extended or adjusted under 35 U.S.C. 154(b) by 119 days.

(21) Appl. No.: 13/645,010

(22) Filed: Oct. 4, 2012

(65) Prior Publication Data

US 2013/0084901 A1 Apr. 4, 2013

(30) Foreign Application Priority Data

Oct. 4, 2011 (GB) .................................. 1117072.7

(51) Int. Cl.
*H04W 4/00* (2009.01)
(52) U.S. Cl.
USPC ........................................................ 455/466
(58) Field of Classification Search
USPC ........................................................ 455/466
See application file for complete search history.

(56) References Cited

U.S. PATENT DOCUMENTS

2008/0153521 A1   6/2008   Benaouda et al.

OTHER PUBLICATIONS

EPO Search report P101097-EP-EPA, Application No. EP 12 27 515.3 6-1856 dated Feb. 27, 2013.
Vodafone: "PS domain only: use of non E.164 MSISDNs", 3GPP Draft; 52-114351 Human to Machine SMS and Non E.164 MSISDNS, 3rd Generation Partnership Project (3GPP), Mobile Competence Centre ; 650, Route des Lucioles ; F-06921 Sophia-Antipoles Cedex ; France, vol. SA WG2, No. Jeju Island; 20111010, Oct. 4, 2011, XP050549526, [retrieved on Oct. 4, 2011]*paragraphs [077.]-[7.3]*.
"3rd Generation Partnership Project; Technical Specification Group Services and System Aspects; System Improvements for Machine-Type Communications; (Release 11)", 3GPP Standard; 3GPP TR 23.888, 3rd Generation Partnership Project (3GPP), Mobile Competence Centre ; 650, Route Des Lucioles ; F-06921 Sophia-Antipolis Cedex ; France, vol. SA WG2, No. V1.4.0, Aug. 5, 2011, pp. 1-139, XP050553713, [retrieved on Aug. 5, 2011] paragraphs [5.13], [06.2], [6.44], [6.48]-[6.48.2] *.
3rd Generation Partnership Project; Technical Specification Group Core Network and Terminals; Numbering, addressing and identification (Release 10)11, 3GPP Standard; 3GPP TS 23.003, 3rd Generation Partnership Project (3GPP), Mobile Competence Centre ; 650, V10.2.0, Jun. 7, 2011, pp. 1-80, XP050552998, [retrieved on Jun. 7, 2011] * paragraph [03.3] *.
Private Telecommunication Network (PTN); Addressing; ETS 300 18911, IEEE, LIS, Sophia Antipolis Cedex, France, vol. ECMATC32, Dec. 1, 1992, XP014012325, ISSN: 0000-0001 * paragraphs [04.41-[04.5] *.

*Primary Examiner* — Joel Ajayi
(74) *Attorney, Agent, or Firm* — Workman Nydegger

(57) ABSTRACT

Short Messaging Service (SMS) messages are handled at a network entity of a Public Land Mobile Network (PLMN) or a device that communicates with a PLMN. An address for a Short Messaging Entity (SME) is provided in Mobile Subscriber ISDN format, comprising a Type of Number (ToN) data field, a Numbering Plan Identification (NPI) data field and a subscriber identifier field. The SME is identified as a Machine Type Communication (MTC) device based on at least one of the ToN and NPI data fields or based on a predetermined code in the subscriber identifier field. A network entity receiving the SME address can identify the SME as an MTC device and further send a message to another network entity, at least one component of the message being based on the identification. This may be applicable for human to machine communications.

17 Claims, 4 Drawing Sheets

MSISDN FOR MACHINE TYPE COMMUNICATION DEVICES

CROSS REFERENCE TO RELATED APPLICATIONS

This application claims priority to United Kingdom Application No. 1117072.7, filed on Oct. 4, 2011, the entirety of which is incorporated herein by reference.

FIELD OF THE INVENTION

The present invention provides a Short Messaging Service (SMS) addressing interface for a network entity of a Public Land Mobile Network (PLMN) or for a device that communicates with a PLMN and a method of handling SMS messages. In particular, the SMS data is addressed to a Machine Type Communication (MTC) device and may be sent from a human controlled mobile device for human to machine communications.

BACKGROUND TO THE INVENTION

The Short Messaging Service (SMS) has become a key feature of cellular communication systems, particularly those based on the standards developed by the Third Generation Partnership Project (3GPP). SMS messages are addressed to a particular mobile subscriber using the Mobile Subscriber ISDN (MSISDN) identity. 3GPP TR 21.905 defines an MSISDN as being an ISDN number. This is equivalent to a number as defined under International Telecommunications Union (ITU) E.164 Standard.

Referring to FIG. 1, there is shown a diagrammatic representation of a simplified message flow for the existing routing of Mobile Originating (MO) SMS data. Messages flow between the following entities: a first User Equipment (UE) 10; the visited Mobile Switching Centre (MSC) 20 for the first UE 10; a Short Message Service Centre (SMSC) 30 in the Home Public Land Mobile Network (HPLMN) of the first UE 10; a Home Location Register (HLR) 40 of a second UE (not shown), which is the recipient of the SMS data; and a visited MSC (VMSC) 50 for the second UE.

An initial step 100 takes place before the first UE 10 has decided to send SMS data. The first UE 10 registers in the visited MSC 20 (which may alternatively be a Serving GPRS Support Node, SGSN). The MSISDN of the first UE 10 is stored in a Visitor Location Register (VLR, not shown). This is downloaded by the HLR (not shown) of the first UE 10. The database storing the MSISDN of the first UE 10 may equivalently be in an SGSN instead.

The first UE 10 sends SMS data to the second UE. Both the first and second UEs may each be alternatively identified as a Short Message Entity (SME). The address of the SMSC 30 for the first UE 10 is sent as an Information Element (IE) in the RP-Data message transmitted by the first UE 10 and shown in step 110. The SMS message and the address of the second UE are both inside the Transport Protocol Data Unit (TPDU) IE in the RP-data message.

The Visited MSC (VMSC) 20 (or SGSN) opens a Charging Data Record (CDR) for the SMS in step 120. The CDR includes the MSISDN and International Mobile Subscriber Identity (IMSI) of the first UE 10, the address of the SMSC 30 and the address for the second UE (extracted from within the TPDU). This is described in more detail in 3GPP TS 32.250 and TS 32.251 and their definition of $O_M$.

In step 130, the VMSC 20 (or SGSN) sends the SMS data to the SMSC 30 of the first UE 10. The address used in the Signalling Connection Control Part (SCCP) is the address of the SMSC 30 in E.164 format. The SCCP payload includes the TPDU (the SMS message and the address for the second UE), the IMSI and MSISDN of the first UE 10 and (duplicated) the address for the SMSC 30. The IMSI of the first UE 10 is included for mobile number portability reasons.

The SMSC 30 of the first UE 10 interrogates the HLR 40 of the second UE in step 140. This assumes that the terminating SME (that is, the second UE) is a mobile subscriber. The address used at the SCCP level is the MSISDN of the second UE in E.164 format. However, the MSISDN for the second UE and the address of the SMSC 30 are also contained inside the payload.

In step 150, the HLR 40 returns the IMSI of the second UE and the address for the VMSC 50 of the second UE. The SMSC 30 then creates a CDR (and/or performs online billing) in step 160.

The SMSC 30 then forwards the SMS message to the VMSC 50 of the second UE in step 170. The VMSC 50 uses the IMSI provided in step 170 to locate the VLR record of the second UE and then tries to deliver the SMS data to the second UE. Mobile Application Part (MAP) is used for transfer of the SMS data in steps 130 and 170. In step 180, a CDR record is opened.

Mobile number portability is another relevant factor to be considered in the routing of SMS traffic. This is further complicated by the way that the user of the first UE 10 might input the address for the recipient second UE. Two different numbering schemes may be used: a) a full International MSISDN (for example, "+44 7748 abcdef"); or b) a "National" number (for example, when a UK mobile terminal contacts another UK mobile terminal, a number such as "07748 abcdef" may be used, even if roaming). In case b), the SMSC 30 converts the number beginning "07748" into "+447748". Commercial SMSCs may also have significant number translation functionality, for example to handle short codes for the second UE.

Referring next to FIG. 2, there is shown a schematic representation of a simplified message flow for existing SMS routing when mobile number portability is used. Where the same features (whether entities or message flow steps) are shown in FIG. 2 as shown in FIG. 1, identical reference numerals have been used. Some of the steps shown in FIG. 1 have been omitted from FIG. 2, simply for clarity purposes (such as CDR opening), but it will be understood that these also take place in the implementation shown in FIG. 2.

An additional network entity is provided in FIG. 2 when compared with FIG. 1. This is a Mobile Number Portability (MNP) entity 35. In some PLMN architectures (for example, in the UK) the MNP entity 35 is placed in the donor network (that is, the PLMN that originally issued the MSISDN to the mobile subscriber). However, other implementations place the MNP entity 35 in the Signalling System 7 (SS7) network of the home country.

As with FIG. 1, in this implementation, the first UE 10 sends SMS data in step 110 to the visited MSC 20. The MSC 20 forwards this data to the SMSC 30 in step 130. However, the SMSC 30 then issues a Send Routing Information (SRI) for Short Message (SM) request in step 240 to the MNP entity 35. The address at the SCCP layer is the MSISDN of the second UE in E.164 format.

The MNP entity 35 then consults a lookup table to determine if a second UE has been 'ported' out of the donor network. In other words, the second UE might not actually be a subscriber to the PLMN in which the MNP entity 35 is located, but it may have been previously. If this is the case, then the MNP entity 35 inserts an SCCP address that points to the home PLMN of the second UE (also known as a recipient network). This may be the exact address of the HLR 40 of the IMSI of the second UE. The contents of the SRI for SM need not be changed. This takes place in step 245.

The HLR 40 of the second UE (that is, in the recipient network) uses the MSISDN in the SCCP payload to retrieve the address for the visited MSC 50 of the second UE. The HLR 40 of the second UE then sends the SRI for SM acknowledgement directly back to the SMSC 30 of the first UE 10. This system functions effectively for provision of SMS data in existing configurations.

Machine Type Communication (MTC) devices are increasingly being employed on cellular communications networks. Many of these devices are intended to operate Packet Switched (PS) services only. 3GPP TS 22.368 (v11.2.0) contains requirements for so-called "Packet Switched (PS) only" operation. A brief extract is reproduced here for convenience.

"7.2.4 Packet Switched (PS) only

The MTC Feature Packet Switched Only is intended for use with MTC Devices that only require packet switched services.

For the Packet Switched Only MTC Feature:
A network operator shall be able to provide PS only subscriptions with or without assigning an MSISDN.
Remote MTC Device triggering shall be supported with or without assigning an MSISDN.
Remote MTC Device configuration shall be supported without the use of an MSISDN.
NOTE: Current remote MTC Device configuration solutions (i.e. Device Management and Over-the-Air configuration) are based on SMS, which assumes the use of MSISDNs."

This means that MTC devices are intended to make use of SMS and it is therefore desirable that they be identified with use of an MSISDN. Although most discussion has focused on SMS from server to MTC devices (such as triggering), it is likely that some MTC devices (for example, games consoles) may benefit from the ability to be contacted from human devices, including "legacy" human devices. Similarly, the user of the MTC device may wish to communicate with a "more human" device.

Issuing an MSISDN using E.164 format to MTC devices is not straightforward though. Limitations within the E.164 format mean that the quantity of unique MSISDN identities that can be issued is restricted. The potentially large number of MTC devices may exhaust the available MSISDN identities using E.164 format. E.164 number shortages are discussed in 3GPP TR 22.988 (v1.1.0) entitled "Study on Alternatives to E.164 for Machine-Type Communications (Release 10)".

One option to address this difficulty is for MTC devices to use SMS with a non-E.164 MSISDN. As indicated above, the current message flow for SMS data relies on MSISDN information in E.164 format. Adapting the SMS message flow to allow the use of non-E.164 MSISDN with minimal impact to the network architecture and message flow is a significant challenge.

SUMMARY OF THE INVENTION

Against this background, there is provided in a first aspect a Short Messaging Service (SMS) addressing interface for a network entity of a Public Land Mobile Network (PLMN). The SMS addressing interface comprises: an input configured to receive an address for a Short Messaging Entity (SME), the SME being a Machine Type Communication, MTC, device, wherein the address is in Mobile Subscriber ISDN (MSISDN) format and comprises: a Type of Number (ToN) data field; and a Numbering Plan Identification (NPI) data field; and a subscriber identifier field; control logic configured to identify that the SME is a Machine Type Communication (MTC) device, based on at least one of the received ToN and NPI data fields or based on the presence of the predetermined code in the received subscriber identifier field.

Thus, the indication that a non-E.164 MSISDN (otherwise known as an MTC-MSISDN) is to be used is provided in the existing data field of the MSISDN address. Specifically, the ToN and/or NPI data fields may provide a specific indication that MTC-MSISDN format is to be used or a predetermined code may be inserted into the subscriber identifier field of the MSISDN address to provide the same indication. The network entity thereby identifies the received MSISDN address as an MTC-MSISDN.

Preferably, the SMS addressing interface further comprises an output arranged to control the network entity to send a message to another network entity, at least one component of the message being set based on the identification that the SME is an MTC device. Optionally for the message, one or more of: an address; and a content of the message is set based on the identification that the SME is an MTC device. Hence, the network entity may act in a specific way, by sending a particular message to another network entity accordingly. The specific message that is sent differs between different network entities. Some particular examples are as follows.

The network entity may be a Short Message Service Centre (SMSC). Then, the input is preferably configured to receive short message data from a Mobile Switching Centre (MSC). This short message data may comprise the address for the SME. Moreover, the control logic may be further configured to determine the Home PLMN (HPLMN) of the SME (that is, the MTC device) and to determine an address for an SMS router in the HPLMN. Preferably, the output is configured to control the SMSC to forward the received short message data to the address for the SMS router.

The SMSC is therefore adapted to convert between the MTC-MSISDN format in the received short message data to an E.164 format address, specifically of an SMS router in the HPLMN of the destination SME. This can then be used as part of the SMS message flow.

In another preferred embodiment, the network entity may be an SMS router. Here, the inputs may be configured to receive short message data from an SMSC. The control logic may be further configured to determine an address in MSISDN format for a Home Location Register (HLR) for the MTC device. Then, the output may be configured to control the SMS router to send a Send Routing Information (SRI) request to the HLR.

Thus, the SMS router identifies that the address within the short message data that it receives is in MTC-MSISDN format and not E.164 format. It therefore uses this address to determine the HLR of the recipient SME. This HLR address is in E.164 format and the SRI request can therefore be sent using Signalling Connection Control Part (SCCP) with an E.164 address.

Optionally, the input may be further configured to receive an International Mobile Subscriber Identity (IMSI) for the MTC device. It may further receive an address for a routing entity of the MTC device. These are received in response to the send routing information request sent to the HLR. The routing entity may be one of: a visited Mobile Switching Centre (MSC); a visited Serving GPRS Support Node (SGSN); a visited Mobility Management Entity (MME); and an IP-Short-Message-Gateway. Then, the outputs may be further configured to control the SMS router to forward the received short message data to the routing entity of the MTC device using the received address. The SMS router is thereby able to complete a conversion from the MTC-MSISDN to the IMSI of the recipient SME. Moreover, the SMS router can then directly forward the short message data to the routing entity of the recipient SME, for delivery to the SME.

In a second aspect, there is provided a network entity of a PLMN comprising the SMS addressing interface described herein. It will be appreciated that the network entity may be one of: a SMSC; and an SMS router.

In a third aspect, there is provided a Short Messaging Service (SMS) addressing interface for a device that is capable of communicating with a PLMN. The interface comprises: an input configured to receive an indication that an SMS is to be addressed to a Short Messaging Entity (SME), the SME being a Machine Type Communication (MTC) device and further configured to receive a subscriber identifier for the SME; and an output, configured to provide an address for the SME, in Mobile Subscriber ISDN (MSISDN) format, the address comprising: a Type of Number (ToN) data field; a Numbering Plan Identification (NPI) data field; and a subscriber identifier field. In order to enable identification of the SME as an MTC device, either (i) at least one of the ToN and NPI data fields is given a value that indicates that the SME is an MTC device or (ii) a predetermined code is inserted into the subscriber identifier field.

In this aspect, a User Equipment (UE) or other user operated device is thereby able to receive an input from a user that an SMS is to be sent to an MTC device, which does not have an MSISDN in E.164 format. The user inputs a subscriber identifier for the recipient SME and the SMS addressing interface converts that into an MTC-MSISDN format, which may be used in the transmission of the short message data to the PLMN.

Advantageously, the device that communicates with the PLMN may be one of: a User Equipment; and a device configured to communicate with a Serving GPRS Support Node (SGSN) a visited Mobility Management Entity, MME, or an IP-Short-Message-Gateway of the PLMN using a Diameter interface. The present invention may also be found in a UE or a device configured to communicate with an SGSN using a Diameter interface comprising the SMS addressing interface described herein.

Beneficially, the subscriber identifier field in any of the aspects of the invention described herein may comprise a Mobile Country Code (MCC); and a Mobile Network Code (MNC) for the International Mobile Subscriber Identify (IMSI) of the SME. By providing the MCC and MNC for the SME, this facilitates a network entity in converting between the MTC-MSISDN format to an address in an appropriate E.164 format.

The present invention may also be found, in another aspect, in a method of handling Short Messaging Service (SMS) messages at a network entity of a Public Land Mobile Network (PLMN). The method comprises: receiving an address for a Short Messaging Entity (SME) in Mobile Subscriber ISDN (MSISDN) format, the SME being a Machine Type Communication (MTC) device, wherein the address comprises a Type of Number (ToN) data field, a Numbering Plan Identification (NPI) data field and a subscriber identifier field; and identifying that the SME is a Machine Type Communication (MTC) device based on at least one of the received ToN and NPI data fields or based on the predetermined code in the received subscriber identifier field.

Preferably the method further comprises sending a message from the network entity to another network entity, at least one component of the message being set based on the identification that the SME is an MTC device. Optionally for the message, one or more of: an address; and a content of the message is set based on the identification that the SME is an MTC device.

Optionally, the network entity is a Short Message Service Centre (SMSC). Then, the step of receiving may further comprise receiving short message data from a Mobile Switching Centre (MSC). The short message data may comprise the address for the SME. The method may then further comprise: determining the Home PLMN of the MTC device and an address for an SMS router in the Home PLMN. The step of sending a message may then further comprise forwarding the received short message data to the address for the SMS router.

Additionally or alternatively, the network entity may be a SMS router. Then, a step of receiving may further comprise receiving short message data from a SMSC. The method may then further comprise: determining an address in Mobile Subscriber ISDN format for a Home Location Register (HLR) for the MTC device. The step of sending a message may comprise sending a send routing information request to the HLR.

In yet another aspect, there may be found a method of handling Short Messaging Service (SMS) messages at a device that is capable of communicating with a Public Land Mobile Network (PLMN). The method comprises: receiving data comprising an indication that an SMS is to be addressed to a Short Messaging Entity (SME) that is a Machine Type Communication (MTC) device, the data further comprising a subscriber identifier for the SME; providing an address for the SME in Mobile Subscriber ISDN format, the address comprising a Type of Number (ToN) data field; a Numbering Plan Identification (NPI) data field; and a subscriber identifier field. In order to enable identification of the SME as an MTC device, either (i) at least one of the ToN and NPI data fields is given a value that indicates that the SME is an MTC device or (ii) a predetermined code is inserted into the subscriber identifier field.

Advantageously in either of these method aspects, the subscriber identifier field may comprise a Mobile Country Code (MCC) and a Mobile Network Code (MNC) for the International Mobile Subscriber Identity (IMSI) of the SME.

In a yet further aspect, the present invention may provide a computer program configured when executed by a processor to cause the processor to perform the method of any of the aspects of the present invention described herein. Optionally, there may provided a computer-readable medium comprising instructions forming this computer program. Additionally or alternatively, the present invention may be found in programmable logic configured to perform the method of any of the aspects of the present invention described herein.

It will also be understood that the above methods can apply to E-UTRAN where SMS can be handled by: (a) "SMS over SGs" as described in 3GPP TS 23.272; or (b) "SMS in the MME" (described in 3GPP TS 23.041 and/or TS 23.401), in which the Mobility Management Entity (MME) handles the SMS with Diameter interfaces to other network entities. It will be further understood that the above methods can also apply to "SMS over generic 3GPP IP access" (described in 3GPP TS 23.204).

It will also be understood that these method aspects can optionally comprise steps or features used to carry out any of the actions described in connection with the SMS addressing interfaces detailed above. Also, any combination of the individual apparatus features or method features described may be implemented, even though not explicitly disclosed.

BRIEF DESCRIPTION OF THE DRAWINGS

The invention may be put into practice in various ways, one of which will now be described by way of example only and with reference to the accompanying drawings in which.

DETAILED DESCRIPTION OF A PREFERRED EMBODIMENT

Figure 3A:
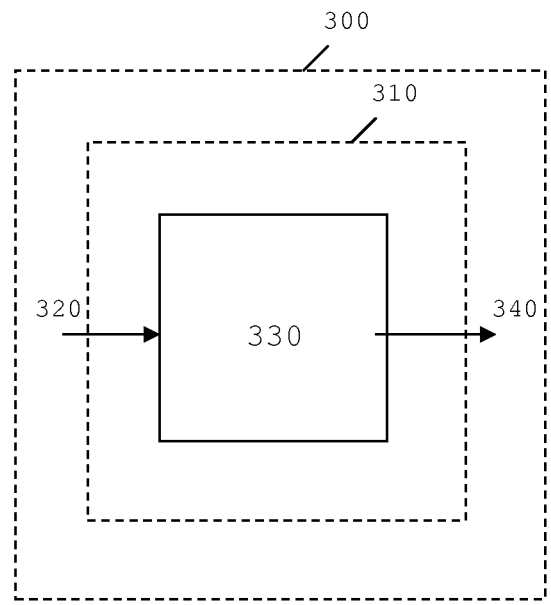
FIG. 3A illustrates a schematic representation of a simplified SMS addressing interface for a network entity in accordance with the present invention.

Referring now to FIG. 3A, there is shown a schematic diagram of an SMS addressing interface 310 according to an embodiment of the present invention. The SMS addressing interface 310 forms part of a network entity 300. The SMS addressing interface 310 comprises an input 320, control logic 330 and an output 340.

The input 320 receives an address for a Short Messaging Entity (SME) in MSISDN format. This comprises a Type of Number (ToN) data field, a Numbering Plan Identification (NPI) data field and a subscriber identifier field. The control logic 330 uses the address received at the input 320 to identify that the SME is a Machine Type Communication (MTC) device. This is done either based on the received ToN and/or NPI data fields, or is based on the presence of a predetermined code in the subscriber identifier field. This new format, referred to as MTC-MSISDN, will be explained in more detail below with reference to specific examples.

The output 340 is arranged to provide a control signal to the network entity 300 to send the message to another network entity on the basis of the identification that the SME is an MTC device.

Although the term SME is used here as a generality, it will be understood that an SME may be a UE or other terminal.

Figure 3B:
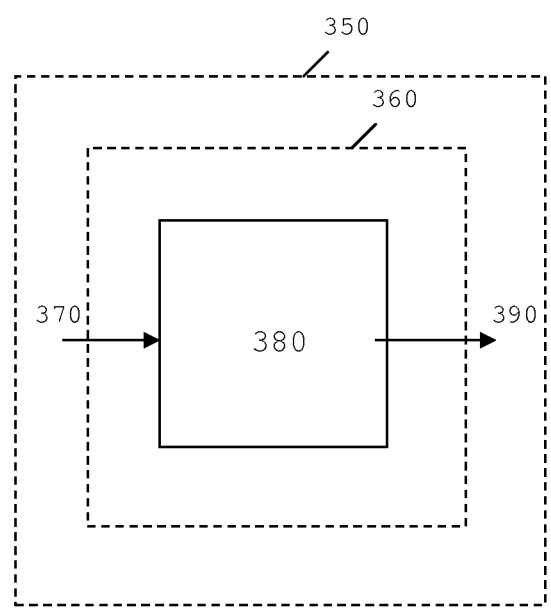
FIG. 3B illustrates a schematic representation of a simplified SMS addressing interface for a device that is configured to communicate with a PLMN in accordance with the present invention.

Referring now to FIG. 3B, there is shown a schematic diagram of an SMS addressing interface 360 for an SME 350 that communicates with a Public Land Mobile Network (PLMN). The SMS addressing interface 360 comprises an input 370, control logic 380 and an output 390. However, it can be understood that the control logic may be separated between the input and output parts and not seen as a separate component. Moreover, the SME 350 may further comprise a transceiver (not shown) and a processor (not shown).

The input 370 receives an indication (from the SME 350 and, more specifically, from a user interface of the SME 350) that an SMS is to be addressed to an SME that is an MTC device. The indication further comprises a subscriber identifier for the recipient SME. Then, the output 390 provides an address for the recipient SME in MSISDN format, comprising: a ToN data field; an NPI data field; and a subscriber identifier field. The control logic 380 may provide this data, based on the data received at the input 370.

The ToN and/or NPI data fields are set or a predetermined code is inserted in the subscriber identifier field so as to identify the SME as an MTC device. Again, specific implementations of this will be described below. Further information on the MTC-MSISDN format is first provided.

For SMS and the PS domain, MSISDN format is used for several purposes and in several protocols, including: on MAP interfaces; Diameter interfaces; on CDRs; on GPRS tunnelling protocol (GTP); Radio Access Network Application Part (RANAP); and as defined in 3GPP TS 23.040 and TS 24.011. Consideration of the message flow shown in FIGS. 1 and 2 and an analysis of MAP (see TS 29.002), the SMS specifications (TS 23.040 and TS 24.011), the billing specifications (TS 32.250, TS 32.251 and TS 32.298) GTP v1 (TS 29.060) and RANAP (TS 25.413) indicates that the MSISDN is used, encoded with Type of Number (ToN), Number Plan Indicator (NPI) fields and Telephony Binary Coded Decimal (TBCD) digits. The TBCD digits are intended to provide a subscriber identifier within the number system identified by the ToN and/or NPI.

On the Diameter interfaces (3GPP TS 29.272 points to TS 29.329) and in GTPv2, the MSISDN is encoded without the ToN and NPI fields. On all these interfaces, the size of the MSISDN fields seem to permit up to 20 TBCD digits to be carried (the Destination SME Address in the TP layer of the MO SMS sent by the UE is probably the most constraining field).

The proposed MTC-MSISDN format, which encodes an indication that the destination SME is an MTC device, therefore provides a suitable addressing format for most interfaces. Those interfaces where the MSISDN is encoded without the ToN and NPI fields may require an alternative format and this will be discussed below.

Figure 1:
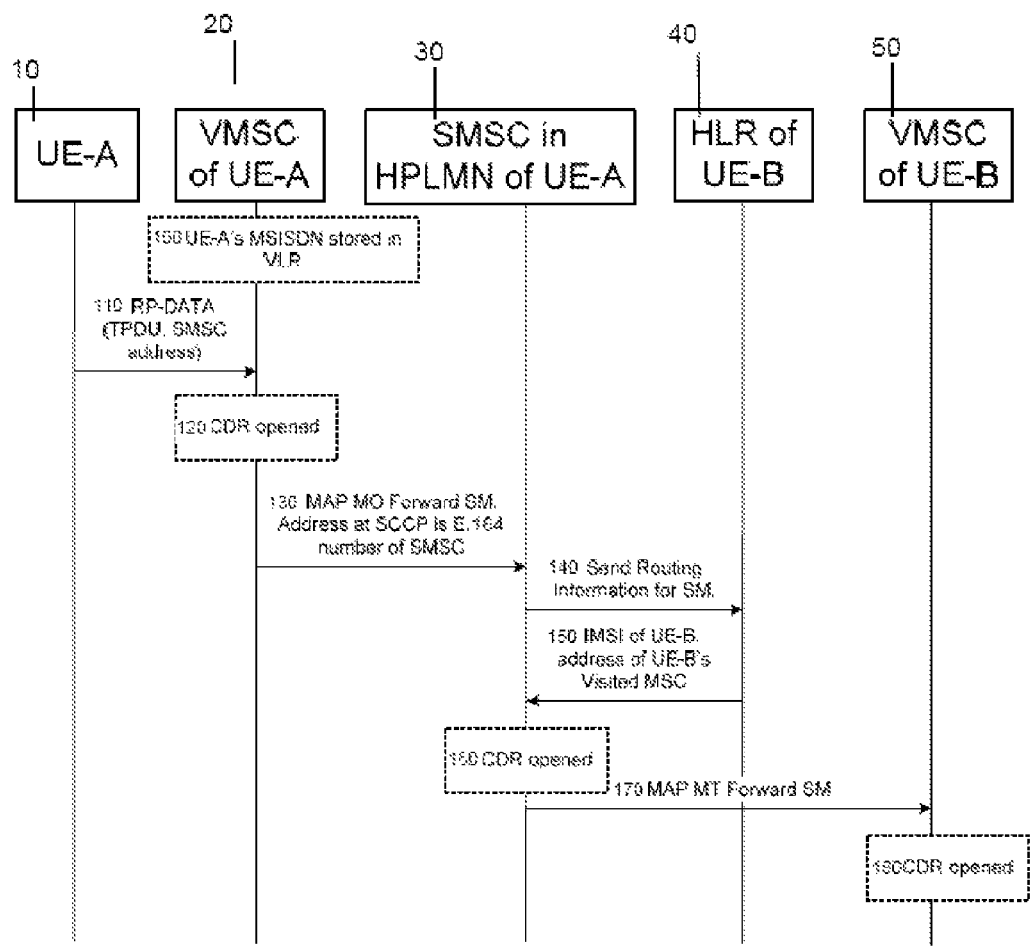
FIG. 1 shows a diagrammatic representation of a simplified message flow for existing mobile-originating SMS routing.
Figure 2:
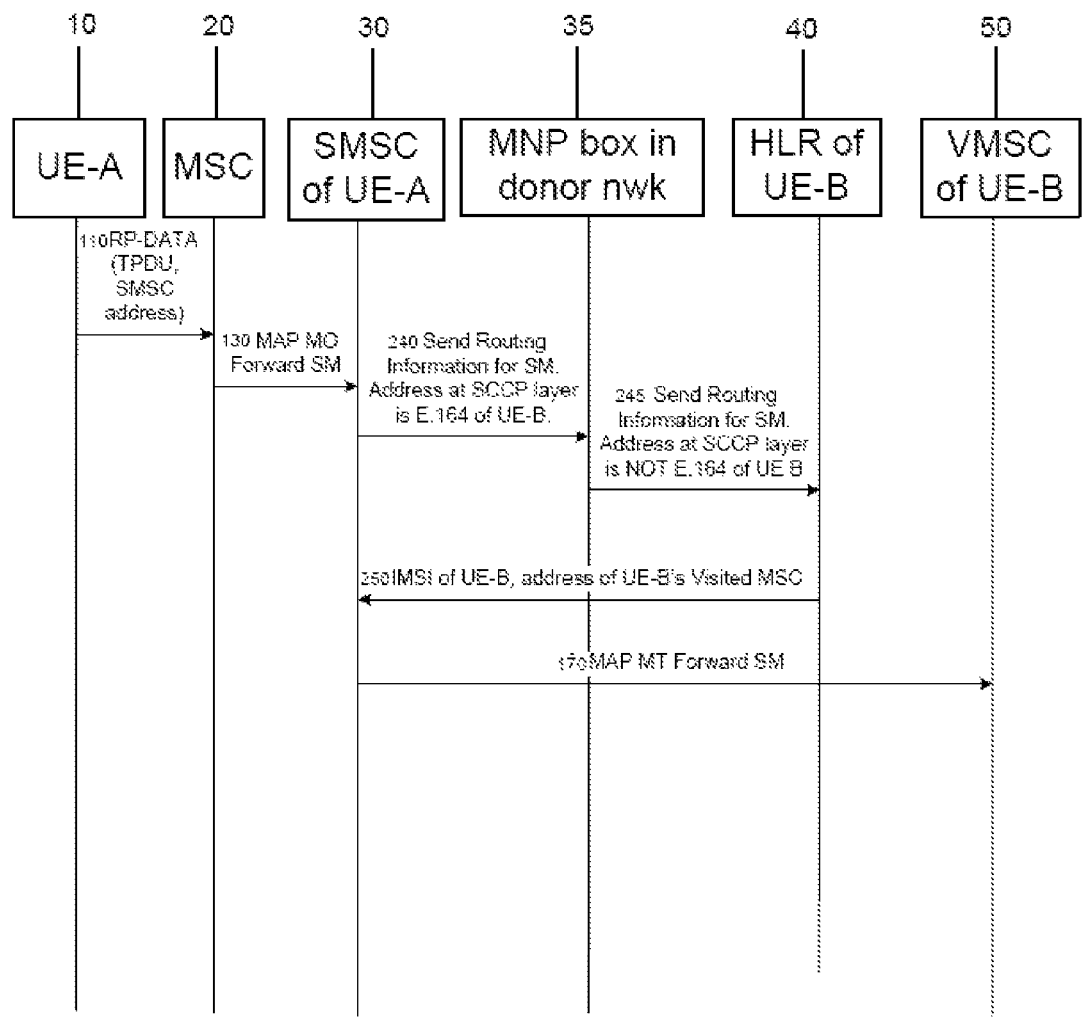
FIG. 2 shows a schematic representation of a simplified message flow for existing SMS routing to handle mobile number portability.
Figure 4:
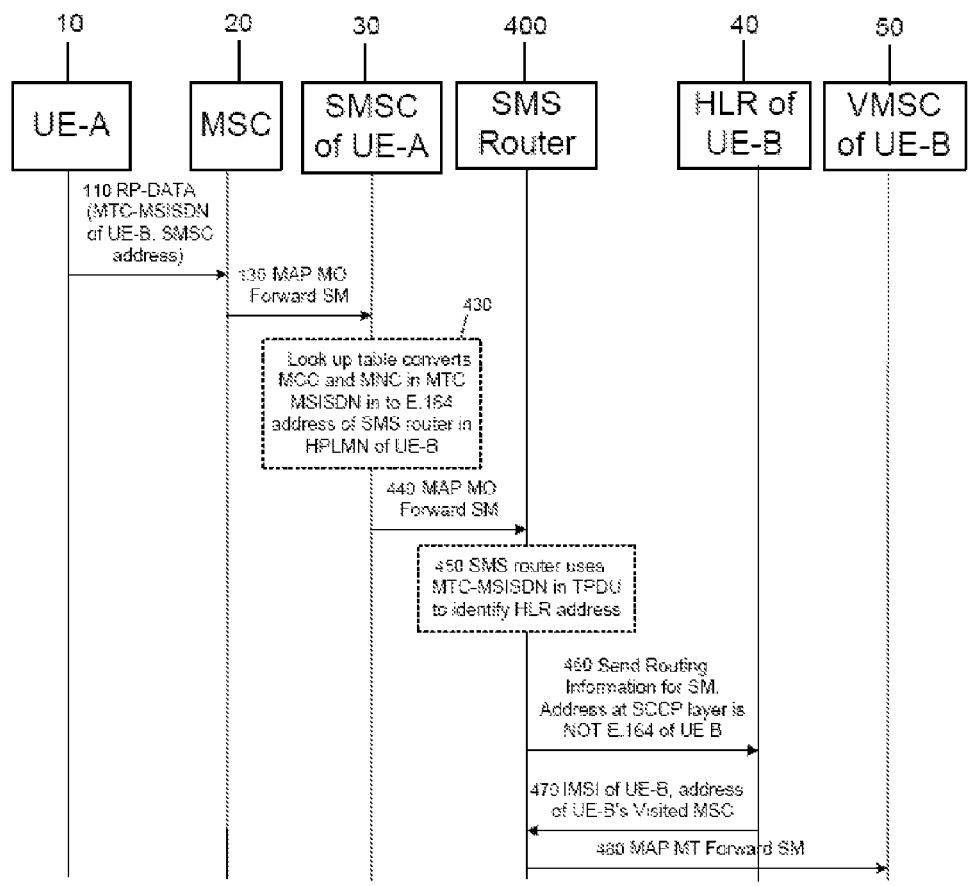
FIG. 4 shows a simplified message flow for a mobile-originating SMS routing in accordance with the present invention.

Referring now to FIG. 4, there is shown a simplified message flow for a mobile-originating SMS routing in accordance with the present invention. Where the same features (whether entities or message flow steps) are shown in FIG. 4 as shown in FIG. 1 or 2, identical reference numerals have been used. As per FIG. 2, some of the steps shown in FIG. 1 have been omitted from FIG. 4, simply for clarity purposes. These include CDR opening, for example. Nevertheless, it will be understood that these additional features are also part of the implementation shown in FIG. 4.

In this specific embodiment, the ToN and/or NPI data fields in the MSISDN format are used to define a new number range for MTC devices. This is referred to as MTC-MSISDN in the following text. Advantageously, the subscriber identifier data field of the MTC-MSISDN format has its leading digits encoded, specifically with the MCC and MNC values used for the IMSI of the recipient SME. In the MSISDN format, the subscriber identifier field (TBCD digits) may have 15 digits. Assuming a three digit MCC and two digits MNC, there are therefore still ten billion numbers available for MTC devices.

Terminals, such as UEs may be configured to indicate an MTC-MSISDN for a recipient SME by use of a specific Man-Machine Interface (MMI). This may be similar to the concept by which an International number is typically entered into existing UEs, by prefixing the MSISDN subscriber identity with a plus ('+') symbol.

As for existing message flows, the first UE 10 transmits the short message data in step 110 to the visited MSC 20. The visited MSC 20 then forwards this using MAP to the SMSC 30 of the first UE in step 130. The destination SME address sent by the UE 10 has the ToN and/or NPI data fields set to indicate that the TBCD digits (for example, 234 15 0123456789) are from the MTC-MSISDN range. The visited MSC 20 (or equivalently SGSN) creates a CDR (not shown) and includes the MTC-MSISDN.

In step 430, the SMSC 30 of the first UE 10 analyses the MTC-MSISDN and uses a lookup table together with the MNC and MCC within the subscriber identifier data field to identify an SMS router 400 in the Home PLMN of the destination SME. The address of the SMS router 400 is found in E.164 format. In step 440, the SMSC 30 forwards the short message data to the SMS router 400. The address of the SMS router 400 is placed in the SCCP address in this transmission which is a Mobile Application Part (MAP) Mobile Originating (MO) Forward Short Message (SM) transmission.

The SMS router 400 then uses the MTC-MSISDN in the TPDU received from the SMSC 30 to identify the address of the HLR 40 of the destination SME. This is achieved using a routing table in step 450.

The SMS router 400 then transmits a Send Routing Information (SRI) for SM request to the HLR 40 in step 460. This is sent using MAP and the HLR 40 address is used at the SCCP layer. The MAP SRI for SM transmission payload contains the MTC-MSISDN of the destination SME. The MSISDN of the destination SME is not the address at the SCCP layer, because that is not in E.164 format. Then, the HLR 40 provides a response comprising the IMSI of the destination SME and the address of the destination SME's visited MSC 50 in step 470.

This is received at the SMS router 400, which then forwards the short message data (using an MAP MT Forward SM message) to the visited MSC 50 of the destination SME in step 480. The visited MSC 50 uses the received IMSI to identify the destination SME and creates a CDR.

Although an embodiment of the present invention has been described above, the skilled person may contemplate various modifications or substitutions. For instance, whilst the SMSC 30 has been described as using a lookup table to identify the SMS router 400 from the MTC-MSISDN, a Domain Name Server (DNS) may alternatively be used. Similarly, a DNS can additionally or alternatively be used in the SMS router 400 in its analysis of the MTC-MSISDN instead of a routing table, in order to identify the HLR 40 address.

Although a visited MSC 50 is part of the message flow described above, this may equivalently be replaced by a visited Serving GPRS Support Node (SGSN) of the destination SME in the above embodiment without affecting the message flow in any other way. Similarly, it will be recognised that the names and functionality of various network entities and interfaces may change without affecting the invention.

Legacy terminals (particularly UEs operated by human users) may also be configured for providing MTC-MSISDN. This can be achieved by use of a "breakout" code that is publicised by the Home PLMN of the first UE 10. If Mobile Number Portability needs to be supported for the MTC devices, the breakout code is desirably common across the operators within the portability group. An example breakout code may be the digits "55". The user of the first UE 10 enters a number such as "55 234 15 0123456789". This is then sent with ToN and NPI indicating E.164 format of MSISDN. The message sequence as shown in FIG. 4 and described above then proceeds, but with a number of slight differences.

In step 130, the visited MSC 20 (or SGSN) of the first UE 10 creates the CDR as usual and includes the breakout code along with the other digits in the destination field when forwarding the short message data to the SMSC 30. In fact, the behaviour of the MSC 20 remains the same as in the above embodiment. Only the information sent by the MSC 20 changes.

The SMSC 30 identifies the breakout code, specifically the "55" prefix, removes it and uses the MCC and MNC (such as 234 15 in the specific example here) to retrieve the MSISDN address of the SMS router 400 within the Home PLMN of the destination SME in E.164 format in step 430. The MAP MO forward SM payload in a step 440 identifies the destination SME with the ToN and NPI set to MTC-MSISDN and the BCD digits set to 234 15 0123456789.

When the destination SME uses a Diameter interface to an SGSN, Mobility Management Entity (MME) or an IP-Short-Message-Gateway, one of the following options may be employed:

a) a new parameter may be used to transfer the MTC-MSISDN (or to indicate that the MSISDN is an MTC-MSISDN);

b) escape digits are included in the MSISDN (e.g. the digits 999 in +447785 9990123456789);

c) the MTC MSISDN is used without ToN and NPI (for instance, the digits are 234 15 7748 0123456789) and, because the CDR is sent to the HPLMN identified by the IMSI, the HPLMN recognises this as a non-E.164 number (similarly, if GTPv2 transfers this MTC MSISDN to the Packet Data Network Gateway (P-GW), the P-GW in the HPLMN can recognise the MTC MSISDN or with VPLMN-P-GW or GGSN, the IMSI is brought into play); and d) the home network downloads the number in national format (for example, with a leading digit of 0, possibly followed by escape digits).

For MO SMS from a device with MTC-MSISDN, the HLR desirably knows whether or not the visited node (MSC/SGSN) supports MTC-MSISDNs. A supporting visited node would support the transport of the MTC ToN and NPI on the Diameter and GTPv2 interfaces. With a non-supporting node, the HLR can use one of the four options described above in relation to the use of a Diameter interface with an SGSN. The Gateway GPRS Support Node (GGSN)/P-GW or SMSC in the HPLMN may reverse the process to remove the escape digits. CDRs generated by a non-supporting node may be sent to the PLMN identified by the IMSI (i.e. the HPLMN). The HPLMN can then remove the escape digits and process the CDR.

Mobile-Originating (MO) SMS data from a device with MTC-MSISDN may optionally be handled in the following way, with reference to FIG. 4. The SMS router 400 may receive a MTC-MSISDN address in message 440 from the SMSC 30. If the VMSC 50 (or, equivalently SGSN) is capable of supporting the MTC-MSISDN format, then the procedures described above either as a simplified message flow for a mobile-originating SMS routing with reference to FIG. 4 or the alternative with reference to legacy terminals may be employed.

However, when the VMSC 50 (or, equivalently SGSN) is not capable of handling the MTC-MSISDN format, such that it would not recognize an address in that format (particularly on the Diameter and GTP v2 interfaces), then the HLR 40 may need to "convert" the MTC-MSISDN format using a new mechanism. These mechanisms may comprise one or more of the options described above in relation to the use of a Diameter interface to an SGSN. In other words, the HLR 40 may re-convert the provided MTC-MSISDN address into a "new" format recognisable by a non-supporting VMSC 50 and send this back to the SMS router 400, so that the SMS router 400 can communicate with the non-supporting VMSC 50 using an address recognised by the VMSC 50. There may not therefore be any communication between the VMSC 50 (or, equivalently SGSN) and the HLR 40. The HLR 40 only communicates with SMS router 400.

Where escape digits are used, the GGSN/P-GW or SMSC in the HPLMN (neither of which are shown) may reverse the process to remove the escape digits. CDRs generated by a network entity not supporting the MTC-MSISDN format may be sent to the PLMN identified by the IMSI (that is, the HPLMN). The HPLMN may then remove the escape digits and process the CDR.

The invention claimed is:

1. A Short Messaging Service, SMS, addressing interface for a network entity of a Public Land Mobile Network, PLMN, comprising:
   an input configured to receive an address for a Short Messaging Entity, SME, the SME being a Machine Type Communication, MTC, device, wherein the address is in Mobile Subscriber ISDN format and comprises: a Type of Number, ToN, data field; a Numbering Plan Identification, NPI, data field; and a subscriber identifier field; and
   control logic configured to identify that the SME is a Machine Type Communication, MTC, device, based on at least one of the received ToN and NPI data fields or based on the presence of a predetermined code in the received subscriber identifier field.

2. The SMS addressing interface of claim 1, further comprising:
   an output arranged to control the network entity to send a message to another network entity, at least one component of the message being set based on the identification that the SME is an MTC device.

3. The SMS addressing interface of claim 2:
   wherein the network entity is a Short Message Service Centre, SMSC;
   wherein the input is configured to receive short message data from a Mobile Switching Centre, the short message data comprising the address for the SME;
   wherein the control logic is further configured to determine the Home PLMN of the SME and to determine an address for an SMS Router in the Home PLMN; and
   wherein the output is configured to control the SMSC to forward the received short message data to the address for the SMS Router.

4. The SMS addressing interface of claim 2:
   wherein the network entity is a Short Message Service Centre, SMSC;
   wherein the input is configured to receive short message data from a Mobile Switching Centre, the short message data comprising the address for the SME and having the predetermined code in the subscriber identifier field;
   wherein the control logic is further configured to determine the Home PLMN of the MTC device based on the subscriber identifier field, to determine an address in Mobile Subscriber ISDN format for an SMS Router in the Home PLMN device and to modify the address in the short message data by removing the predetermined code in the subscriber identifier field and setting at least one of the ToN and NPI data fields so as to identify the SME as an MTC device; and
   wherein the output is configured to control the SMSC to forward the modified short message data to the address for the SMS Router.

5. The SMS addressing interface of claim 2:
   wherein the network entity is an SMS Router;
   wherein the input is configured to receive short message data from a Short Message Service Centre, SMSC;
   wherein the control logic is further configured to determine an address in Mobile Subscriber ISDN format for a Home Location Register, HLR for the MTC device; and
   wherein the output is configured to control the SMS Router to send a Send Routing Information Request to the HLR.

6. The SMS addressing interface of claim 5:
   wherein the input is further configured to receive an International Mobile Subscriber Identity, IMSI, for the MTC device and an address for a routing entity of the MTC device in response to the Send Routing Information Request sent to the HLR;
   wherein the output is further configured to control the SMS Router to forward the received short message data to the routing entity of the MTC device using the received address; and
   wherein the routing entity is one of: a visited Mobile Switching Centre, MSC; a visited Serving GPRS Support Node, SGSN; a visited Mobility Management Entity, MME; and an IP-Short-Message-Gateway.

7. The SMS addressing interface of claim 1, wherein the subscriber identifier field comprises a Mobile Country Code, MCC, and a Mobile Network Code, MNC for the International Mobile Subscriber Identity, IMSI, of the SME.

8. A Short Messaging Service, SMS, addressing interface for a device capable of communicating with a Public Land Mobile Network, PLMN, the interface comprising:
   an input configured to receive an indication that an SMS is to be addressed to a Short Messaging Entity, SME, the SME being a Machine Type Communication, MTC, device and further configured to receive a subscriber identifier for the SME; and
   an output configured to provide an address for the SME, in Mobile Subscriber ISDN format, the address comprising: a Type of Number, ToN, data field; a Numbering Plan Identification, NPI, data field; and a subscriber identifier field;
   wherein, in order to enable identification of the SME as an MTC device, either (i) at least one of the ToN and NPI data fields is given a value that indicates that the SME is an MTC device or (ii) a predetermined code is inserted in the subscriber identifier field.

9. The SMS addressing interface of claim 8, wherein the device that communicates with the PLMN is one of: a User Equipment; a device configured to communicate with a Serving GPRS Support Node, SGSN, a visited Mobility Management Entity, MME, or an IP-Short-Message-Gateway of the PLMN using a Diameter interface.

10. The SMS addressing interface of claim 8, wherein the subscriber identifier field comprises a Mobile Country Code, MCC, and a Mobile Network Code, MNC for the International Mobile Subscriber Identity, IMSI, of the SME.

11. A method of handling Short Messaging Service, SMS, messages at a network entity of a Public Land Mobile Network, PLMN, the method comprising:
   receiving an address for a Short Messaging Entity, SME, in Mobile Subscriber ISDN format, the SME being a Machine Type Communication, MTC, device, wherein the address comprises a Type of Number, ToN, data field, a Numbering Plan Identification, NPI, data field and a subscriber identifier field; and
   identifying that the SME is an MTC device based on at least one of the received ToN and NPI data fields or based on a predetermined code in the received subscriber identifier field.

12. The method of claim 11, further comprising:
   sending a message from the network entity to another network entity, at least one component of the message being set based on the identification that the SME is an MTC device.

13. The method of claim 12, wherein the network entity is a Short Message Service Centre, SMSC, wherein the step of receiving further comprises receiving short message data from a Mobile Switching Centre, the short message data comprising the address for the SME, the method further comprising:

determining the Home PLMN of the MTC device and an address for an SMS Router in the Home PLMN; and wherein the step of sending a message further comprises forwarding the received short message data to the address for the SMS Router.

14. The method of claim 12, wherein the network entity is an SMS Router, wherein the step of receiving further comprises receiving short message data from a Short Message Service Centre, SMSC, the method further comprising:

determining an address in Mobile Subscriber ISDN format for a Home Location Register, HLR for the MTC device; and wherein the step of sending a message comprises sending a Send Routing Information Request to the HLR.

15. A method of handling Short Messaging Service, SMS, messages at a device capable of communicating with a Public Land Mobile Network, PLMN, the method comprising:

receiving data comprising an indication that an SMS is to be addressed to a Short Messaging Entity, SME, that is a Machine Type Communication, MTC, device, the data further comprising a subscriber identifier for the SME;

providing an address for the SME in Mobile Subscriber ISDN format, the address comprising: a Type of Number, ToN, data field; a Numbering Plan Identification, NPI, data field; and a subscriber identifier field; and wherein, in order to enable identification of the SME as an MTC device, either (i) at least one of the ToN and NPI data fields is given a value that indicates that the SME is an MTC device or (ii) a predetermined code is inserted in the subscriber identifier field.

16. A computer program configured when executed by a processor to cause the processor to perform the method of claim 10.

17. A computer program configured when executed by a processor to cause the processor to perform the method of claim 15.

* * * * *